US012614437B2

(12) United States Patent　(10) Patent No.:　US 12,614,437 B2

Xi et al.　(45) Date of Patent:　Apr. 28, 2026

(54) FIRE ALARM DEVICE AND SYSTEM

(71) Applicant: Gulf Security Technology Co., Ltd., Qinhuangdao (CN)

(72) Inventors: Jie Xi, Shanghai (CN); Hongliang Lei, Qinhuangdao (CN); Zhanlin Zhang, Qinhuangdao (CN); Maoqing Yang, Qinhuangdao (CN); Benliang Li, Qinhuangdao (CN); Xiangyang Li, Qinhuangdao (CN)

(73) Assignees: KIDDE FIRE PROTECTION, LLC, Bradenton, FL (US); GULF SECURITY TECHNOLOGY CO., LTD, Qinhuangdao (CN)

( * ) Notice: Subject to any disclaimer, the term of this patent is extended or adjusted under 35 U.S.C. 154(b) by 60 days.

(21) Appl. No.: 18/516,925

(22) Filed: Nov. 21, 2023

(65) Prior Publication Data

US 2024/0177585 A1　May 30, 2024

(30) Foreign Application Priority Data

Nov. 28, 2022　(CN) ......................... 202211498118.2

(51) Int. Cl.
*G08B 17/10*　(2006.01)
*H04L 12/40*　(2006.01)
(52) U.S. Cl.
CPC .............. *G08B 17/10* (2013.01); *H04L 12/40* (2013.01)
(58) Field of Classification Search
CPC ...................................................... G08B 17/10
See application file for complete search history.

(56) References Cited

U.S. PATENT DOCUMENTS

| | | | |
|---|---|---|---|
| 5,691,704 | A | 11/1997 | Wong |
| 6,078,269 | A | 6/2000 | Markwell et al. |
| 6,107,925 | A | 8/2000 | Wong |
| 6,166,647 | A | 12/2000 | Wong |
| 6,313,744 | B1 | 11/2001 | Capowski et al. |
| 6,362,743 | B1 | 3/2002 | Tanguay et al. |

(Continued)

FOREIGN PATENT DOCUMENTS

| | | |
|---|---|---|
| CN | 107134105 B | 10/2019 |
| CN | 109979151 B | 3/2021 |

(Continued)

OTHER PUBLICATIONS

European Search Report for Application No. 23212760.5, Issued Mar. 3, 2025, 5 Pages.

*Primary Examiner* — Travis R Hunnings

(74) *Attorney, Agent, or Firm* — CANTOR COLBURN LLP

(57) ABSTRACT

The present application relates to a fire alarm device, the device comprising: an application-specific integrated circuit ASIC for performing one or more of bus communication, smoke detection, and button status detection, wherein the application-specific integrated circuit ASIC comprises: a storage unit for storing configuration data; a hardware encoder/decoder for communicating with a bus; and a logic circuit for receiving a parsed command from the hardware decoder and providing a returned command to the bus via the hardware encoder based on the configuration data, the returned command is used to indicate whether a fire exists. The present application also relates to a fire alarm system.

11 Claims, 4 Drawing Sheets

(56)    References Cited

U.S. PATENT DOCUMENTS

| | | | |
|---|---|---|---|
| 6,437,698 | B1 | 8/2002 | Byrne et al. |
| 7,379,390 | B2 | 5/2008 | McFarland |
| 7,679,547 | B2 | 3/2010 | Wu et al. |
| 7,830,252 | B2 | 11/2010 | Keeney et al. |
| 7,994,928 | B2 | 8/2011 | Richmond |
| 8,378,806 | B2 | 2/2013 | Piccolo, III |
| 8,760,280 | B2 | 6/2014 | Piccolo, III |
| 8,910,298 | B2 | 12/2014 | Gettings et al. |
| 9,030,328 | B2 | 5/2015 | Aebersold |
| 9,117,360 | B1 | 8/2015 | Conforti |
| 9,153,968 | B2 | 10/2015 | Meah et al. |
| 9,159,218 | B2 | 10/2015 | Simoncic et al. |
| 9,373,245 | B2 | 6/2016 | Gerrish et al. |
| 9,520,042 | B2 | 12/2016 | Eck |
| 9,824,563 | B2 | 11/2017 | Uchida |
| 9,922,509 | B2 | 3/2018 | Marien |
| 10,008,105 | B2 | 6/2018 | Barrieau et al. |
| 10,282,975 | B2 | 5/2019 | King et al. |
| 10,473,777 | B2 | 11/2019 | Dipoala et al. |
| 11,047,841 | B2 | 6/2021 | Desjardins |
| 11,195,400 | B2 | 12/2021 | Gao et al. |
| 2004/0056765 | A1* | 3/2004 | Anderson ............... G08B 17/10 340/584 |
| 2006/0282642 | A1* | 12/2006 | Garlick ............... G06F 15/7814 711/173 |
| 2007/0008157 | A1* | 1/2007 | Siemens ................. G08B 17/10 340/628 |
| 2011/0018726 | A1* | 1/2011 | Gonzales ............... G08B 29/22 340/628 |
| 2015/0077240 | A1* | 3/2015 | Eck ........................ G08B 17/10 340/501 |
| 2018/0092191 | A1* | 3/2018 | Siefer ..................... H02J 9/005 |
| 2020/0320844 | A1 | 10/2020 | Buchholz |
| 2021/0069538 | A1* | 3/2021 | Magnone ............... A62C 31/24 |
| 2022/0101700 | A1 | 3/2022 | Deshpande et al. |
| 2024/0325807 | A1* | 10/2024 | Lee ..................... H01M 50/204 |
| 2024/0328920 | A1* | 10/2024 | Gadonniex .......... G08B 29/145 |

FOREIGN PATENT DOCUMENTS

| | | |
|---|---|---|
| CN | 214504164 U | 10/2021 |
| CN | 216310993 U | 4/2022 |
| EP | 1369836 A1 | 12/2003 |
| EP | 0944887 B1 | 3/2007 |
| EP | 2306419 A1 | 4/2011 |
| EP | 2907117 B1 | 8/2016 |

* cited by examiner

FIRE ALARM DEVICE AND SYSTEM

TECHNICAL FIELD

The present application relates to a field of fire alarm and, more specifically, to a fire alarm device and system.

BACKGROUND

Fire is one of the common disasters that causes huge loss, which can be greatly reduced if it is detected in time and handled as early as possible. Therefore, on-site devices or fire alarm devices (e.g., smoke detectors, input/output modules, acoustic/optical alarms, manual fire alarm buttons, etc.) are set up for areas with potential fire risks. In an early stage of a fire or when a fire may occur, the on-site devices provide alarm prompts after detecting suspicious signals or receive external alarm inputs, so that relevant personnel can deal with the fire in time to minimize the loss.

For the existing fire alarm device, in order to ensure its functionality, an embedded central computing unit CPU (or microcontroller MCU) is usually set in the fire alarm device, and software programming is performed on the CPU or MCU to achieve bus communication, smoke detection algorithm, button status checking, and other functions. However, the CPU or MCU (in order to ensure its universality) generally contains a large number of modules, such as CPU core (e.g., for running C code), flash memory (e.g., for storing code), random access memory RAM, clock generator, watchdog timer (e.g., for monitoring abnormal status), basic interval timer (e.g., for generating heartbeat signals), counter, analog-to-digital converter, peripheral bridge, and so on. In this way, the use of the CPU or MCU can bring flexibility in usage (such as more flexible programming), but it also leads to higher power consumption, larger chip wafer area (such as due to more memory), and reduced computation capability.

SUMMARY

According to an aspect of the present application, there is provided a fire alarm device, the device comprising: an application-specific integrated circuit ASIC for performing one or more of bus communication, smoke detection, and button status detection, wherein the application-specific integrated circuit ASIC comprises: a storage unit for storing configuration data; a hardware encoder/decoder for communicating with a bus; and a logic circuit for receiving a parsed command from the hardware decoder and providing a returned command to the bus via the hardware encoder based on the configuration data, the returned command is used to indicate whether a fire exists.

As a supplement or replacement of the foregoing, in the device, the hardware decoder is used to decode a message received from the bus according to the configuration data to obtain the parsed command.

As a supplement or replacement of the foregoing, in the device, the hardware encoder is used to encode data provided by the logic circuit according to the configuration data to upload the encoded data to the bus.

As a supplement or replacement of the foregoing, in the device, the application-specific integrated circuit ASIC further comprises: a timing circuit for providing a clock signal to the logic circuit and the hardware encoder/decoder.

As a supplement or replacement of the foregoing, in the device, the storage unit is a flash, the flash receives the configuration data through a serial port.

As a supplement or replacement of the foregoing, the device further comprises: a general purpose input/output port, wherein the logic circuit is configured to receive an external input and output alarm information via the general purpose input/output port.

As a supplement or replacement of the foregoing, the device further comprises: a bus interface, wherein the hardware encoder/decoder is configured to communicate with the bus via the bus interface.

As a supplement or replacement of the foregoing, the device further comprises: a power management module coupled with the bus interface to power the application-specific integrated circuit ASIC based on a command on the bus.

As a supplement or replacement of the foregoing, in the device, the fire alarm device is any one of an input/output module, an acoustic/optical alarm, a manual fire alarm button, and a smoke detector.

According to another aspect of the present application, there is provided a fire alarm system, the system comprising: a fire alarm device as previously described; and a controller, wherein the controller controls the fire alarm device via a bus.

The fire alarm device of embodiments of the present application realizes one or more of the functions of bus communication, smoke detection, and button status detection, etc., through the application-specific integrated circuit ASIC (instead of a CPU or MCU), thereby greatly reducing the chip wafer area. For example, the watchdog, RAM, large-capacity Flash, timer, and other modules in the CPU are no longer needed in the application-specific integrated circuit ASIC (e.g., the CPU needs a large Flash to store the C program, whereas the solution of the embodiments of the present application need only a very small-capacity storage unit to store (e.g., less than 100 bytes) of configuration information), and because the entire ASIC circuit is a customized circuit, it has lower power consumption, lower cost and better computing performance (compared to the CPU or MCU).

DESCRIPTION OF THE DRAWINGS

The above and other purposes and advantages of the present application will be made more complete and clear from the following detailed description in conjunction with the accompanying drawings, in which the same or similar elements are denoted by the same reference numerals.

DETAILED DESCRIPTION

The following will provide a further detailed description of the implementations of the present application in conjunction with the accompanying drawings and embodiments. The following embodiments are used to illustrate the present application, but cannot be used to limit the scope of the present application.

In the description of the present specification, the description referring to the terms "one embodiment", "some embodiments", "an example", "specific examples", or "some examples", etc., means that the specific features, structures, materials, or characteristics described in conjunction with the embodiment or example are included in at least one embodiment or example of the embodiments of the present application. In this specification, schematic expressions of the above terms need not be directed to the same embodiment or example. Moreover, the specific features, structures, materials, or characteristics described may be combined in any one or more of the embodiments or examples in a suitable manner. Furthermore, the terms "first", "second", and "third" are used for descriptive purposes only and are not to be construed as indicating or implying relative importance. Furthermore, without contradicting each other, a person skilled in the art may combine the different embodiments or examples and the characteristics of the different embodiments or examples described in this specification.

Figure 1:
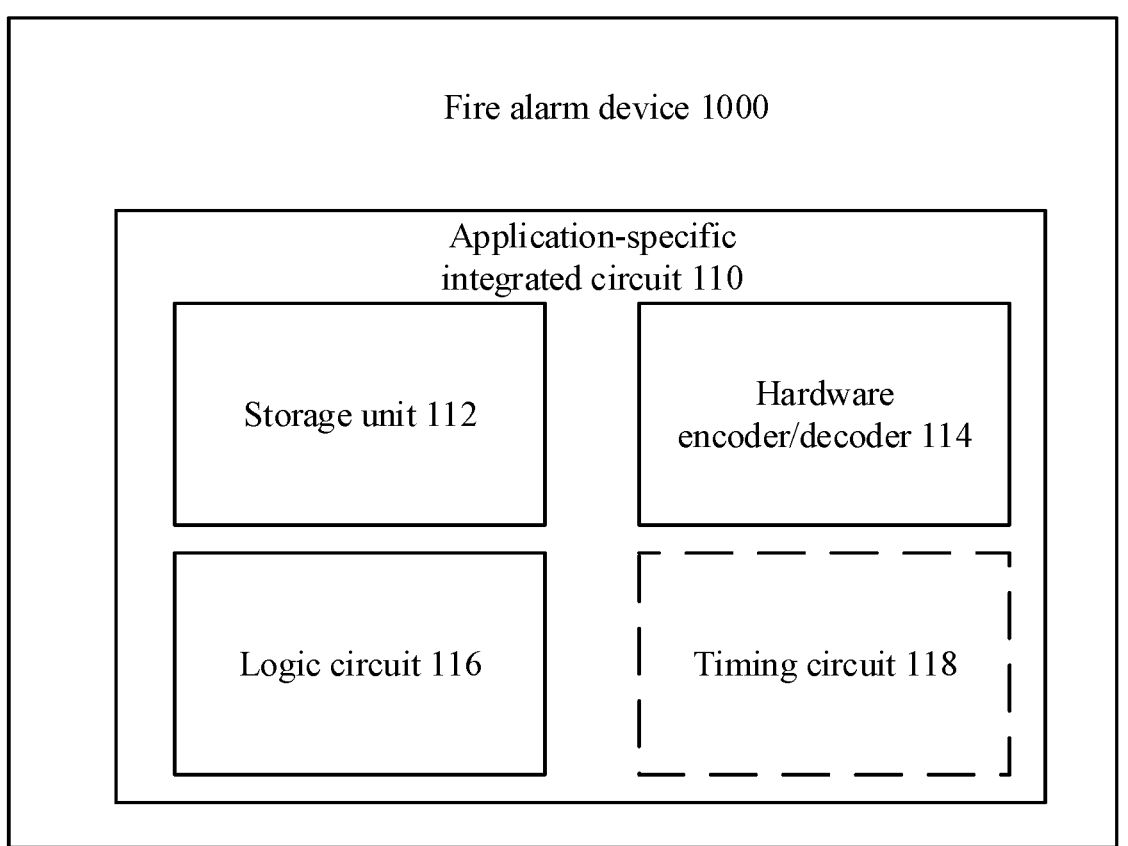
FIG. 1 shows a structural schematic diagram of a fire alarm device according to an embodiment of the present application.

FIG. 1 shows a structural schematic diagram of a fire alarm device 1000 according to an embodiment of the present application. As shown in FIG. 1, the fire alarm device 1000 comprises an application-specific integrated circuit ASIC 110, the application-specific integrated circuit ASIC 110 may be used to implement various functions related to the fire alarm, including, but not limited to, bus communication, smoke detection, button status detection, and so on. For example, where the fire alarm device 1000 is a smoke detector, the application-specific integrated circuit ASIC 110 is used to implement functions such as bus communication, smoke detection, alarm, and so on. For example, where the fire alarm device 1000 is a manual fire alarm button (call point), the application-specific integrated circuit ASIC 110 is used to implement functions such as bus communication, button status detection, alarm, and so on.

In one or more embodiments, all logic units in the application-specific integrated circuit ASIC 110 are customized for a particular application, so programmers cannot change interconnections of a chip. The application-specific integrated circuit ASIC can bring optimized storage units or mechanical structures, resulting in a smaller area of a final finished circuit compared to the CPU or MCU (e.g., the area is reduced to one-half or more of the area of the original CPU).

With continued reference to FIG. 1, the application-specific integrated circuit ASIC 110 comprises: a storage unit 112 for storing configuration data; a hardware encoder/decoder 114 for communicating with a bus; and a logic circuit 116 for receiving a parsed command from the hardware decoder and providing a returned command to the bus via the hardware encoder based on the configuration data, the returned command is used to indicate whether a fire exists.

In one embodiment, the configuration data comprises an address code (e.g. pre-written by an electronic encoder) unique for the fire alarm device 1000, whereby the address code may be used to distinguish between different fire alarm devices or on-site devices. In one embodiment, the returned command contains this unique address code, enabling a fire alarm controller to locate an area where the fire alarm has occurred in a timely manner after receiving the returned command via the bus.

In one embodiment, the application-specific integrated circuit ASIC 110 may further comprise: a timing circuit 118 for providing a clock signal to the logic circuit 116 and the hardware encoder/decoder 114. In one embodiment, the storage unit 112 is a flash, the flash receives the configuration data (e.g., less than 100 bytes) through a serial port. Thus, the storage unit 112 may use a very small-capacity flash.

Although not shown in FIG. 1, in one embodiment, the above-described fire alarm device 1000 may further comprise: a general purpose input/output port, wherein the logic circuit 116 is configured to receive an external input and output alarm information via the general purpose input/output port. In one embodiment, the above-described fire alarm device 1000 may further comprise: a bus interface, wherein the hardware encoder/decoder 114 is configured to communicate with the bus via the bus interface. In one embodiment, the above-described fire alarm device 1000 may further comprise: a power management module coupled with the bus interface to power the application-specific integrated circuit ASIC 110 based on a command on the bus.

In one or more embodiments, the fire alarm device 1000 may be any one of an input/output module, an acoustic/optical alarm, a manual fire alarm button, and a smoke detector.

Figure 2:
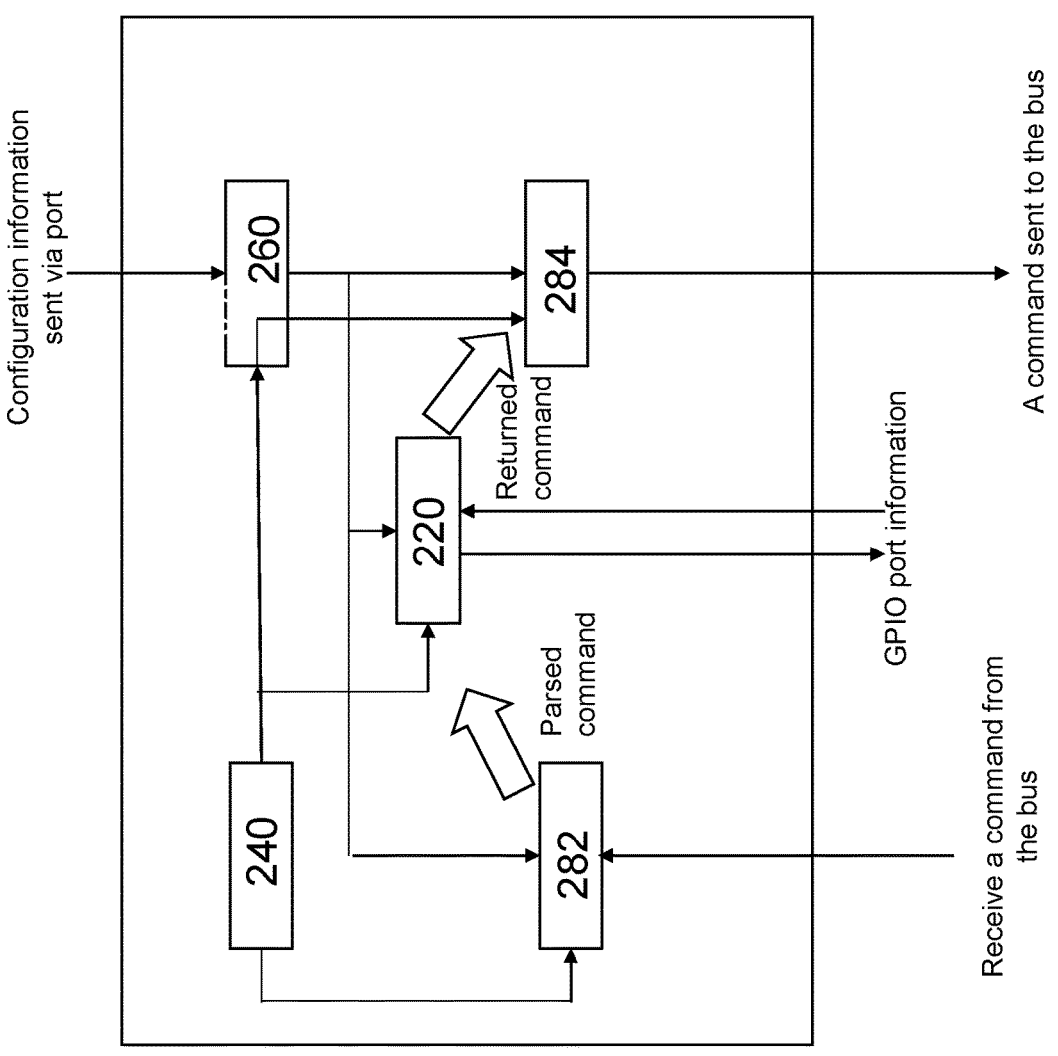
FIG. 2 shows a schematic diagram of signal interaction between various modules within a fire alarm device according to an embodiment of the present application.

Referring to FIG. 2, FIG. 2 shows a schematic diagram of signal interaction between various modules within a fire alarm device according to an embodiment of the present application. As shown in FIG. 2, a flash 260 is configured to receive the configuration information through the serial port, such as configuring once at the time of production. The configuration information may be provided to a hardware decoder 282, a logic circuit 220, and a hardware encoder 284. In addition, a timing circuit 240 may provide clock signals to the various modules (including the flash 260, the hardware decoder 282, the logic circuit 220, and the hardware encoder 284).

In one embodiment, the hardware decoder 282 is configured to decode a message received from the bus according to the configuration data to obtain the parsed command. The hardware decoder 282 then provides the parsed command to the logic circuit 220. In one embodiment, the hardware encoder 284 is configured to encode data (e.g., the returned command) provided by the logic circuit 220 according to the configuration data, thereby uploading the encoded data to the bus. For example, a fire alarm controller (utilizing non-polarity 2-bus technology) sends a patrol command to each on-site device (i.e., fire alarm device) during a patrol cycle. The hardware decoder 282 receives the patrol command coming from the bus and parses the patrol command according to the bus protocol. Similarly, the hardware encoder 284 encodes the command returning from the logic circuit 220 according to the bus protocol and uploads the encoded command to the bus.

In addition, as shown in FIG. 2, the logic circuit 220 may also interact with GPIO port (i.e., general purpose input/output port), for example, to receive a manual alarm button input or to provide an acoustic/optical alarm output, etc.

Figure 3:
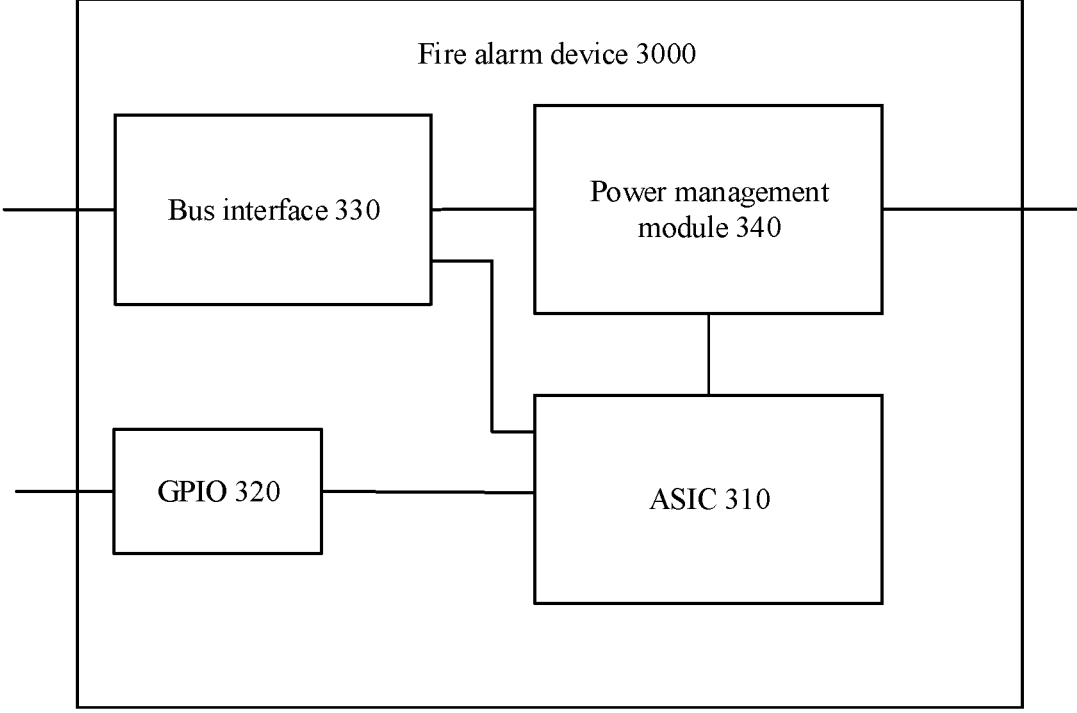
FIG. 3 shows a structural schematic diagram of a fire alarm device according to an embodiment of the present application.

FIG. 3 shows a structural schematic diagram of a fire alarm device 3000 according to an embodiment of the present application. As shown in FIG. 3, in addition to an application-specific integrated circuit ASIC 310, the fire alarm device 3000 may comprise: a general purpose input/output port 320, a bus interface 330, and a power management module 340. Wherein, the general purpose input/output port 320 is coupled with the application-specific integrated circuit ASIC 310 configured to receive an external

5 | 6 input and output alarm information via the general purpose input/output port 320. For example, where the fire alarm device 3000 is a manual fire alarm button, the application-specific integrated circuit ASIC 310 is configured to receive the external input (i.e., alarm button input) via the general purpose input/output port 320. The application-specific integrated circuit ASIC 310 may also emit an acoustic/optical alarm through its own or an external alarm device via the general purpose input/output port 320.

The application-specific integrated circuit ASIC 310 is also configured to couple with the bus interface 330 for communicating with the bus via the bus interface 330. The bus interface 330 is also configured to couple with the power management module 340, which is particularly useful in some cases. For example, a battery unit may comprise a main power source and a backup power source, and under normal circumstances, the power management module 340 is configured to utilize the main power source to power various modules within the fire alarm device 3000. And when a fire, accident, or other emergency situation in a building results in a utility power failure, the power management module 340 is configured to switch from the main power source to the backup power source, in order to ensure that the fire alarm device 3000 can operate properly.

Figure 4:
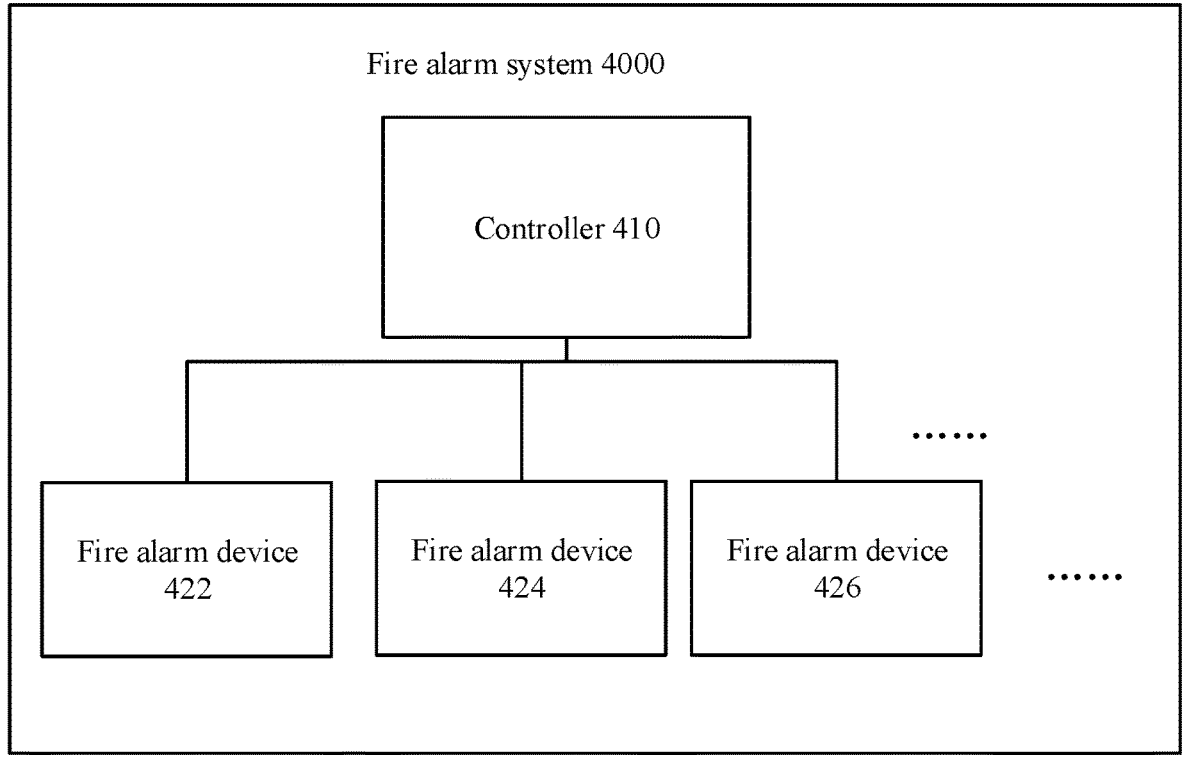
FIG. 4 shows a structural schematic diagram of a fire alarm system according to an embodiment of the present application.

FIG. 4 shows a structural schematic diagram of a fire alarm system 4000 according to an embodiment of the present application. As shown in FIG. 4, the fire alarm system 4000 comprises a controller 410 and a plurality of fire alarm devices (e.g., fire alarm devices 422, 424, 426, etc.). The fire alarm devices 422, 424, 426, etc. are connected with the controller 410 by means of a 2-bus. In one embodiment, the controller 410 periodically sends patrol commands to various fire alarm devices in order to monitor the proper operation of the fire alarm system 4000 and to give acoustic and optical alarms for specific faults.

In one embodiment, the controller 410 is configured to receive fire signals from various fire alarm devices and to activate the fire alarm devices. In one embodiment, the controller 410 is also configured to indicate the location of the fire and record related information. In one embodiment, the controller 410 is also configured to activate a fire alarm signal through a fire alarm sending device or activate an automatic fire extinguishing device and a fire linkage control device through an automatic fire extinguishing control device.

It is to be noted that the above-described embodiments of the device are merely schematic, wherein the modules illustrated as separate components may also not be physically separated, i.e. they may be located in one place or may also be distributed to a plurality of network modules. Some or all of these modules can be selected to fulfill the purpose of the solution of the embodiments according to actual needs. It can be understood and implemented by a person of ordinary skill in the art without creative labor.

In summary, the fire alarm device of embodiments of the present application realizes one or more of the functions of bus communication, smoke detection, and button status detection, etc., through the application-specific integrated circuit ASIC (instead of a CPU or MCU), thereby greatly reducing the chip wafer area. For example, the watchdog, RAM, large-capacity Flash, timer, and other modules in the CPU are no longer needed in the application-specific integrated circuit ASIC (e.g., the CPU needs a large Flash to store the C program, whereas the solution of the embodiments of the present application need only a very small-capacity storage unit to store (e.g., less than 100 bytes) of configuration information), and because the entire ASIC circuit is a customized circuit, it has lower power consumption, lower cost and better computing performance (compared to the CPU or MCU).

Although preferred embodiments of the present application have been described, those skilled in the art may make additional changes and modifications to these embodiments once they have knowledge of the basic inventive concepts. Therefore, the appended claims are intended to be construed to include the preferred embodiments as well as all changes and modifications that fall within the scope of the present application. Obviously, those skilled in the art may make various changes and variations to the present application without departing from the spirit and scope of the present application. Thus, to the extent that such changes and variations of the present application fall within the scope of the claims of the present application and their technical equivalents, the present application is intended to encompass such changes and variations.

What is claimed is:

1. A fire alarm system comprising: a plurality of fire alarm devices and a controller configured to control the fire alarm devices via a bus, each fire alarm device comprising:
   an application-specific integrated circuit for performing one or more of bus communication, smoke detection, and button status detection, wherein the application-specific integrated circuit comprises:
   a storage unit for storing configuration data, wherein the configuration data comprises an address code unique for the fire alarm device;
   a hardware encoder/decoder for communicating with a bus; and
   a logic circuit for receiving a parsed command from the hardware decoder and providing a returned command to the bus via the hardware encoder based on the configuration data, the returned command is used to indicate whether a fire exists, and wherein the returned command contains the unique address code;
   a bus interface, wherein the hardware encoder/decoder is configured to communicate with the bus via the bus interface; and
   a power management module coupled with the bus interface to power the application-specific integrated circuit based on a command on the bus, wherein the power management module is configured to, if there is a power failure, switch from a main power source to a backup power source;
   wherein the controller is configured to periodically send patrol commands to the fire alarm devices in order to monitor the proper operation of the fire alarm system and to give acoustic and/or optical alarms for specific faults.

2. The fire alarm system of claim 1, wherein the hardware decoder is used to decode a message received from the bus according to the configuration data to obtain the parsed command.

3. The fire alarm system of claim 1, wherein the hardware encoder is used to encode data provided by the logic circuit according to the configuration data to upload the encoded data to the bus.

4. The fire alarm system of claim 1, wherein the application-specific integrated circuit further comprises: a timing circuit for providing a clock signal to the logic circuit and the hardware encoder/decoder.

5. The fire alarm system of claim 1, wherein the storage unit is a flash, the flash receives the configuration data through a serial port.

6. The fire alarm system of claim 1, the device further comprises: a general purpose input/output port, wherein the logic circuit is configured to receive an external input and output alarm information via the general purpose input/output port.

7. The fire alarm system of claim 1, wherein the fire alarm device is any one of an input/output module, an acoustic/optical alarm, a manual fire alarm button, and a smoke detector.

8. The fire alarm system of claim 1, wherein the controller is configured to receive fire signals from various fire alarm devices and to activate the fire alarm devices.

9. The fire alarm system of claim 1, wherein the controller is configured to indicate the location of the fire and record related information.

10. The fire alarm system of claim 1, wherein the controller is configured to activate a fire alarm signal through a fire alarm sending device.

11. The fire alarm system of claim 1, wherein the controller is configured to activate an automatic fire extinguishing device and a fire.

* * * * *